US 9,852,000 B2

(12) United States Patent
Ma

(10) Patent No.: US 9,852,000 B2
(45) Date of Patent: Dec. 26, 2017

(54) CONSOLIDATING OPERATIONS ASSOCIATED WITH A PLURALITY OF HOST DEVICES

(71) Applicant: EMPIRE TECHNOLOGY DEVELOPMENT LLC, Wilmington, DE (US)

(72) Inventor: Xudong Ma, Clifton Park, NY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/915,217

(22) PCT Filed: Aug. 27, 2013

(86) PCT No.: PCT/US2013/056698
§ 371 (c)(1),
(2) Date: Feb. 26, 2016

(87) PCT Pub. No.: WO2015/030717
PCT Pub. Date: Mar. 5, 2015

(65) Prior Publication Data
US 2016/0210165 A1 Jul. 21, 2016

(51) Int. Cl.
*G06F 9/455* (2006.01)
*G06F 9/50* (2006.01)

(52) U.S. Cl.
CPC ........ *G06F 9/45558* (2013.01); *G06F 9/5088* (2013.01); *G06F 2009/4557* (2013.01)

(58) Field of Classification Search
None
See application file for complete search history.

(56) References Cited

U.S. PATENT DOCUMENTS 5,930,511 A * 7/1999 Hinsley .................... G06F 8/45
717/164
7,873,776 B2 * 1/2011 Hetherington ........ G06F 9/3802
711/5

(Continued)

OTHER PUBLICATIONS

International Search Report and Written Opinion of the International Searching Authority, International application No. PCT/US2013/056698, Mar. 18, 2014.

(Continued)

*Primary Examiner* — Mehran Kamran
(74) *Attorney, Agent, or Firm* — Turk IP Law, LLC

(57) ABSTRACT

Techniques described herein generally relate to consolidating computation tasks associated with a plurality of virtual machines. In one embodiment, a method may include forming a pipeline having at least a first core and a second core after having detected a formation condition, identifying a first set of operations of a first virtual machine running on a first host device that are similar to a second set of operations of a second virtual machine running on a second host device, identifying a third set of operations of the first virtual machine that are similar to a fourth set of operations of the second virtual machine, dispatching the first set of operations and the second set of operations to the first core of the pipeline for execution, and dispatching the third set of operations and the fourth set of operations to the second core of the pipeline for execution.

14 Claims, 9 Drawing Sheets

(56) References Cited

U.S. PATENT DOCUMENTS

| | | | | |
|---|---|---|---|---|
| 8,924,975 | B2* | 12/2014 | Memik | G06F 9/4843 702/186 |
| 9,052,935 | B1* | 6/2015 | Rajaa | G06F 9/45558 |
| 2005/0278722 | A1* | 12/2005 | Armstrong | G06F 9/5077 718/104 |
| 2006/0171244 | A1* | 8/2006 | Ando | G06F 12/0897 365/52 |
| 2007/0282572 | A1* | 12/2007 | Larus | G06F 9/5066 703/2 |
| 2008/0059769 | A1* | 3/2008 | Rymarczyk | G06F 9/30181 712/209 |
| 2009/0013153 | A1* | 1/2009 | Hilton | G06F 9/5077 712/29 |
| 2009/0125902 | A1* | 5/2009 | Ghosh | G06F 9/45533 718/1 |
| 2009/0313620 | A1* | 12/2009 | Sedukhin | G06F 8/61 718/1 |
| 2010/0262974 | A1* | 10/2010 | Uyeda | G06F 9/4856 718/105 |
| 2010/0293353 | A1* | 11/2010 | Sonnier | G06F 15/167 711/170 |
| 2011/0023047 | A1* | 1/2011 | Memik | G06F 9/4843 718/104 |
| 2011/0055514 | A1* | 3/2011 | Kanak | G06F 9/45533 711/173 |
| 2011/0161955 | A1* | 6/2011 | Woller | G06F 9/4406 718/1 |
| 2011/0276962 | A1* | 11/2011 | Chambers | G06F 9/3885 718/1 |
| 2011/0296423 | A1* | 12/2011 | Elnozahy | G06F 9/54 718/102 |
| 2012/0084777 | A1* | 4/2012 | Jayamohan | G06F 9/5044 718/1 |
| 2012/0159478 | A1* | 6/2012 | Spradlin | G06F 11/3636 718/1 |
| 2012/0240224 | A1* | 9/2012 | Payne | H04L 63/1416 726/21 |
| 2012/0260239 | A1* | 10/2012 | Martinez Canedo | G06F 8/456 717/149 |
| 2013/0145375 | A1* | 6/2013 | Kang | G06F 21/53 718/104 |
| 2013/0227571 | A1* | 8/2013 | Jayamohan | G06F 9/5044 718/1 |
| 2014/0075438 | A1* | 3/2014 | He | H04L 67/08 718/1 |
| 2014/0115587 | A1* | 4/2014 | Qin | G06F 9/45533 718/1 |
| 2014/0196034 | A1* | 7/2014 | Amano | G06F 9/45533 718/1 |
| 2014/0337836 | A1* | 11/2014 | Ismael | G06F 9/455 718/1 |
| 2015/0049096 | A1* | 2/2015 | Nataros | G06F 9/45558 345/506 |
| 2016/0077862 | A1* | 3/2016 | Vinberg | G06F 8/61 718/1 |

OTHER PUBLICATIONS

H. Andres Lagar-Cavilla et al., "SnowFlock: Rapid Virtual Machine Cloning for Cloud Computing", Proceedings of the 4th ACM European conference on Computer systems (Eurosys), Nuremberg, Germany, Apr. 1-3, 2009, pp. 12.

Alejandro Rico et al., "Scalable Simulation of Decoupled Accelerator Architectures", Jun. 3, 2010, Retrieved from <URL: https://web.archive.org/web/20130630131622/https://www.ac.upc.edu/app/research-reports/html/2010/14/tasksim.pdf>.

Hasitha Muthumala Waidyasooriya et al., "Task Allocation with Algorithm Transformation for Reducing Data-Transfer Bottlenecks in Heterogeneous Multi-Core Processors: A Case Study of HOG Descriptor Computation", IEICE Transactions on Fundamentals of Electronics, Communications and Computer Sciences, Dec. 2010, pp. 2570-2580, vol. E93.A, No. 12.

* cited by examiner

900 A computer program product

904 A signal bearing medium 902 at least one of one or more instructions for forming a pipeline having at least a first core and a second core, after having detected a formation condition;

one or more instructions for identifying a first set of operations of a first virtual machine running on a first host device that are similar to a second set of operations of a second virtual machine running on a second host device;

one or more instructions for identifying a third set of operations of the first virtual machine that are similar to a fourth set of operations of the second virtual machine;

one or more instructions for dispatching the first set of operations and the second set of operations to the first core of the pipeline for execution; and/or One or more instructions for dispatching the third set of operations and the fourth set of operations to the second core of the pipeline for execution 906 a communication medium 908 a non-transitory computer readable medium 910 a recordable medium

FIG. 9

CONSOLIDATING OPERATIONS ASSOCIATED WITH A PLURALITY OF HOST DEVICES

CROSS-REFERENCE TO RELATED APPLICATION

The present application is a U.S. National Stage filing under 35 U.S.C. §371 of International Application No. PCT/US2013/056698, filed on Aug. 27, 2013 and entitled "CONSOLIDATING OPERATIONS ASSOCIATED WITH A PLURALITY OF HOST DEVICES." International Application No. PCT/US2013/056698, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

In some systems for performing parallel computations, a large number of virtual machines may be run using host devices having generalized processors. Considerable energy and time may be allocated to support the host devices to perform a large number of similar tasks and to communicate with other host devices. Although such systems may reallocate resources to carry out operations within a single host, such systems may fail to improve operations between different host devices. Accordingly, improvements may be made in such systems.

SUMMARY

In accordance with at least some embodiments of the present disclosure, a method to consolidate computation tasks associated with a plurality of virtual machines running on one or more host devices is disclosed. The method includes forming a pipeline having at least a first core and a second core after having detected a formation condition, identifying a first set of operations of a first virtual machine running on a first host device that are similar to a second set of operations of a second virtual machine running on a second host device, identifying a third set of operations of the first virtual machine that are similar to a fourth set of operations of the second virtual machine, dispatching the first set of operations and the second set of operations to the first core of the pipeline for execution, and dispatching the third set of operations and the fourth set of operations to the second core of the pipeline for execution.

In accordance with at least some embodiments of the present disclosure, a non-transitory computer readable medium embodying executable instructions is disclosed. The executable instructions, in response to execution by a processor, cause the processor to perform a method to consolidate computation tasks associated with a plurality of virtual machines running on one or more host devices. The method includes identifying a first set of operations of a first virtual machine running on a first host device that are similar to a second set of operations of a second virtual machine running on a second host device, identifying a third set of operations of the first virtual machine that are similar to a fourth set of operations of the second virtual machine, dispatching the first set of operations and the second set of operations to a first core of a pipeline for execution, and dispatching the third set of operations and the fourth set of operations to a second core of the pipeline for execution The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings:

FIG. 9 shows a block diagram illustrating a computer program product that is arranged to consolidate computation tasks associated with a plurality of virtual machines, all arranged in accordance with at least some embodiments of the present disclosure.

DETAILED DESCRIPTION

Figure 1:
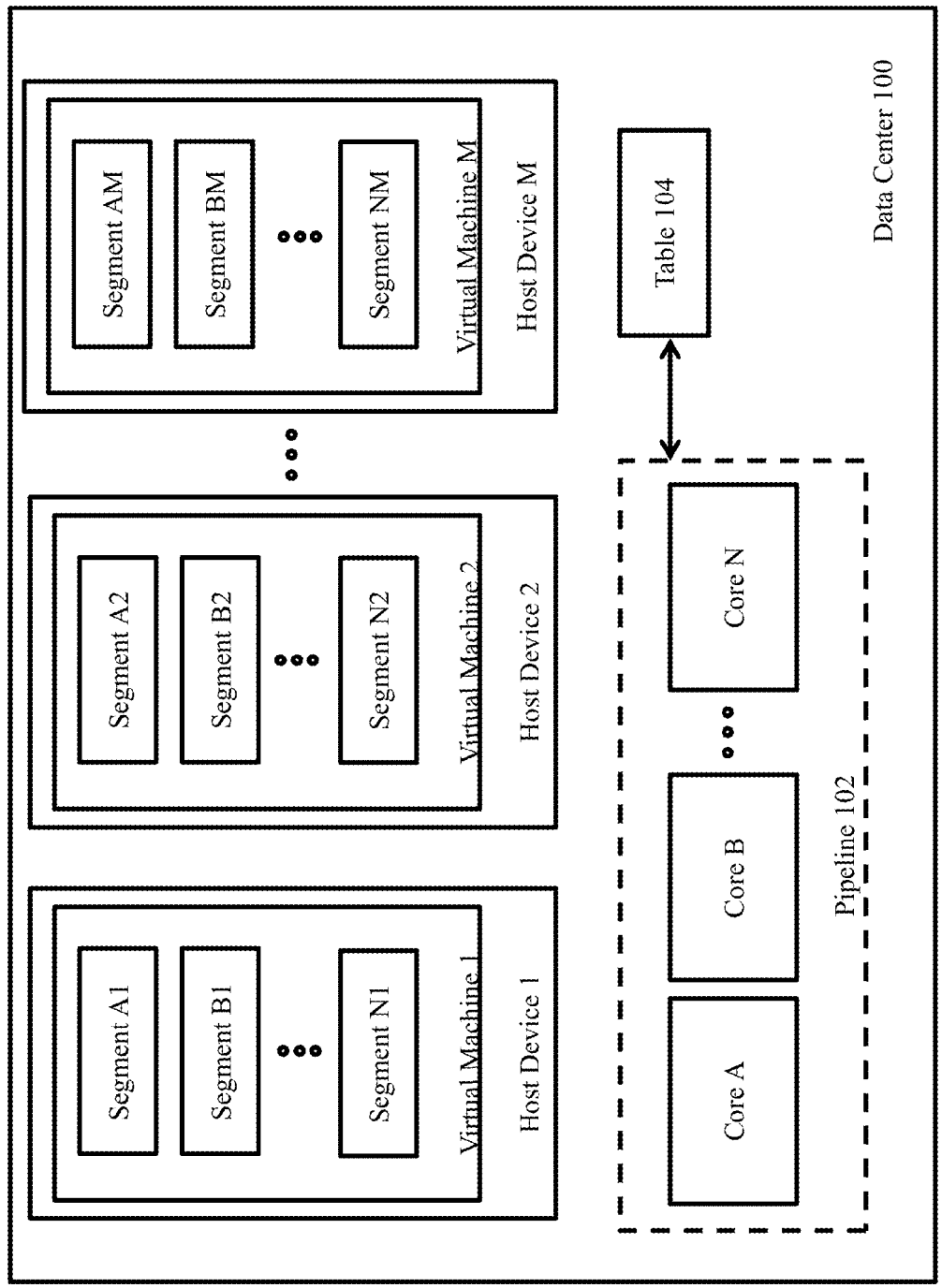
FIG. 1 is an illustration of a multi-core system that may be used to consolidate computation tasks associated with multiple virtual machines running on multiple host devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the disclosure, as generally described herein, and illustrated in the Figures, can be arranged, substituted, combined, and designed in a wide variety of different configurations, all of which are explicitly contemplated and made part of this disclosure.

Throughout this disclosure, the terms "host" and "host device" may be used interchangeably. The terms "processor core" and "core" may also be used interchangeably. The terms "code segment" and "segment" may be used interchangeably.

This disclosure is generally drawn, inter alia, to methods, apparatus, systems, devices, and computer program products related to managing a plurality virtual machines running on one or more host devices.

Briefly stated, techniques described herein generally relate to a method to consolidate computation tasks associated with a plurality of virtual machines. One embodiment of the method may include forming a pipeline having at least a first core and a second core after having detected a formation condition, identifying a first set of operations of a first virtual machine running on a first host device that are similar to a second set of operations of a second virtual machine running on a second host device, identifying a third set of operations of the first virtual machine that are similar to a fourth set of operations of the second virtual machine, dispatching the first set of operations and the second set of operations to the first core of the pipeline for execution, and dispatching the third set of operations and the fourth set of operations to the second core of the pipeline for execution.

FIG. 1 is an illustration of a multi-core system that may be used to consolidate computation tasks associated with multiple virtual machines running on multiple host devices, in accordance with at least some embodiments of the present disclosure. A data center 100 in FIG. 1, which may include host devices 1 through M, where M may represent an integer greater than 2. Each host device may be configured to operate a corresponding virtual machine (e.g., virtual machines 1 through M). Alternatively or additionally, each host device may be configured to operate more than one virtual machine. Also, some of the host devices executing virtual machines may not reside in the same data center 100.

As illustrated, a virtual machine may be configured to execute A to N partitioned segments of code. In some embodiments, a computer task for a virtual machine may be partitioned into multiple segments. Here, segments A1 to N1 may correspond to virtual machine 1 (VM 1); segments A2 to N2 may correspond to virtual machine 2 (VM 2); and segments AM to NM may correspond to virtual machine M (VM M). For illustration purposes, similar code segments, which refer to executable instructions for performing similar operations, are assigned the same letter designations. In other words, segments A1 to AM illustrated in FIG. 1 may be similar. "Similar operations" can broadly refer to operations that may be of the same or similar type (e.g., floating point operation, input/output operation, multimedia operation, data communication operation, and/or others). For example, many multimedia related computations may involve extensive use of Fast-Fourier Transform (FFT) operations. These multimedia computations may be considered similar, and the FFT operations may be efficiently performed by certain specific-purpose cores or accelerators.

In some embodiments, similar operations may be consolidated to be performed by multiple cores (e.g., core A through core N, where N may correspond to an integer greater than 2) in a pipeline 102. This multi-core pipeline 102 may be configured to serve a group of M virtual machines. The cores in the pipeline 102 may belong to or otherwise be associated with different host devices residing in different data centers. In some embodiments, one or more of the cores of the data center 100 may be more efficient at performing particular operations than a generalized processor core. For example, a numerical computation core may be more tailored to perform floating point operations; a multimedia core may be more tailored to perform multimedia related operations; an input/output core may be more tailored to handle input/output operations, and others. Such core(s) may include an accelerator and/or other component to improve the efficiency in performing the specific operations.

In some embodiments, any of the host devices in the data center 100 or even a host device outside of the data center 100 may be configured to monitor and/or manage the pipeline 102. In addition to processor cores, this host device may also include sensors, such as temperature sensors, humidity sensors, fault-detection sensors, and others. In response to certain detected events (e.g., temperature and/or humidity in certain region of the data center 100 rising above a threshold, malfunctioning of a certain hard drive function in the data center 100, and others), the sensors may send detected signals to the processor cores for further processing. Such a host device may be configured to execute a monitoring module (not shown in FIG. 1), which may include executable instructions for monitoring operations of the cores in the data center 100, monitoring and controlling operations of the pipeline 102, and other operations.

The data center 100 may also include a table 104, which may be a shared storage space among at least the host devices 1 through M and the pipeline 102. Subsequent paragraphs will further detail the utilization of the table 104.

Figure 2:
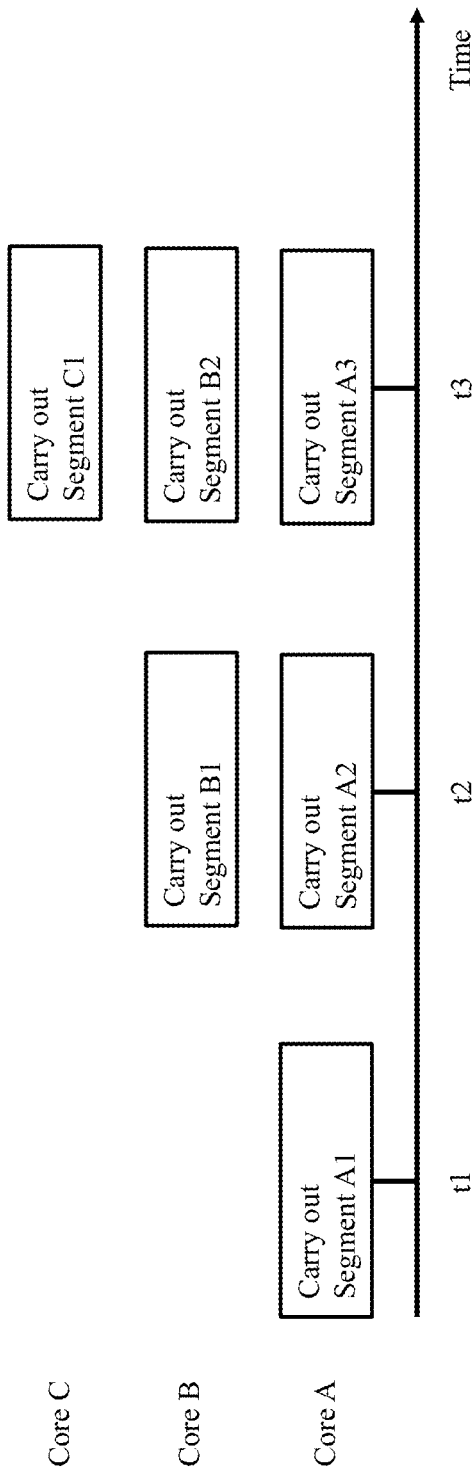
FIG. 2 illustrates some example operations of a multi-core pipeline.

FIG. 2 illustrates some example operations of a multi-core pipeline, in accordance with at least some embodiments of the present disclosure. In conjunction with FIG. 1, suppose segments A1 to AM of the various virtual machines are for operations similar to each other, segments B1 to BM are for operations similar to each other, and segments C1 to CM are also for operations similar to each other. Suppose the data center 100 formulates the pipeline 102, so that core A is configured to carry out segments A1 to AM, core B is configured to carry out segments B1 to BM, and core C is configured to carry out segments C1 to CM. In some embodiments, at time 1 (t1), core A of the pipeline 102 carries out segment A1 of virtual machine 1 (VM 1). At time 2 (t2), core A carries out another segment A of another virtual machine, such as segment A2 of virtual machine 2 (e.g., VM 2), and core B of the pipeline 102 carries out segment B1 of VM 1. At time 3 (t3), core A carries out yet another segment A of another virtual machine, such as segment A3 of virtual machine 3 (e.g., VM 3), and core B also proceeds to carry out another segment B of another virtual machine, such as segment B2 of VM 2. In addition, core C carries out segment C1 of VM 1. In short, the pipeline 102 may be configured to perform operations of multiple virtual machines. One core in the pipeline 102 may be configured to execute one group of similar code segments, while another core in the same pipeline 102 may be configured to execute another group of similar code segments.

Figure 3:
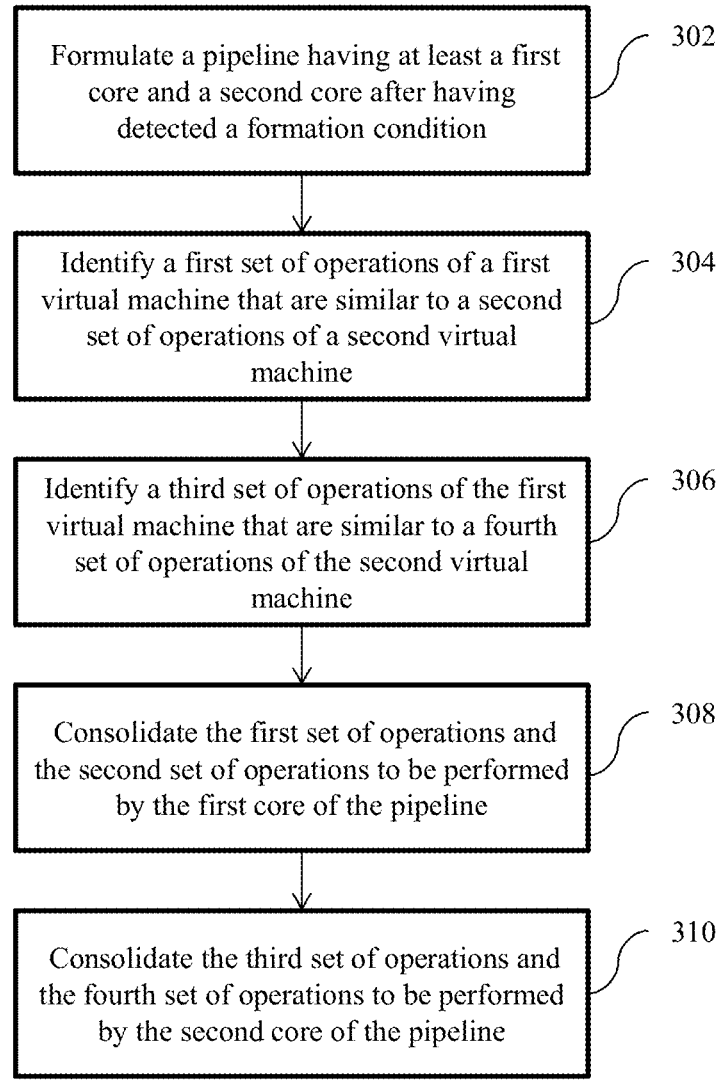
FIG. 3 illustrates a flow chart of an example method to consolidate operations associated with a plurality of host devices.

FIG. 3 illustrates a flow chart of an example method 300 to consolidate operations associated with a plurality of host devices, in accordance with at least some embodiments of the present disclosure. Method 300 may include one or more operations, functions, or actions as illustrated by one or more of blocks 302, 304, 306, 308 and/or 310. Although the blocks are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided.

Method 300 may begin in block 302 "formulate a pipeline having at least a first core and a second core after having detected a formation condition." Block 302 may be followed by block 304 "identify a first set of operations of a first virtual machine that are similar to a second set of operations of a second virtual machine," and block 304 may be followed by block 306 "identify a third set of operations of the first virtual machine that are similar to a fourth set of operations of the second virtual machine." Block 306 may be followed by block 308 "consolidate the first set of operations and the second set of operations to be performed by the first core of the pipeline," and block 308 may be followed by block 310 "consolidate the third set of operations and the fourth set of operations to be performed by the second core of the pipeline."

In conjunction with FIG. 1, in block 302, one host device in the data center 100, which may also be referred to as the consolidation host device, may be configured to look for a pipeline formation condition. In one embodiment, the consolidation host device may be a separate/different host device than host devices 1 to M shown in FIG. 1. In another embodiment, one of the host devices 1 to M shown in FIG. 1 may operate as the consolidation host device, in addition to operating its own respective virtual machine.

In some embodiments, the consolidation host device may be configured to look for common types of instructions and/or similar types of operations that are being performed by different virtual machines of a plurality of host devices. For example, the consolidation host device may determine that a first and a second virtual machine are executing a common type of instructions (e.g., floating point instructions, Extensible Markup Language (XML), MultiMedia eXtension (MMX) instructions, and others). The consolidation host device may also determine that the instructions carried out by the first and second virtual machines both involve similar operations, such as encoding/decoding multimedia data, processing XML files, and others.

In other embodiments, the consolidation host device may be configured to monitor whether a VM fork or a similar operation has been applied, count the number of times such an operation has been applied, and trigger pipeline formation after a threshold number of the VM fork or similar operations have been applied. In some embodiments, when a VM fork operation is called in one virtual machine, multiple copies of the same virtual machine may be generated. All instances of the virtual machines may process an increasing number of requests, such as user inputs.

In still other embodiments, the consolidation host device may be configured to monitor the number of virtual machines that are being used to perform similar computation tasks, the number of general purpose processors or cores in different servers and/or data centers that are being used to perform specialized processes, and/or the number of host devices that are being underutilized. The pipeline formation condition may be considered to have occurred, when any of the following example scenarios takes place: a threshold number of virtual machines performing similar computation tasks is met; a general purpose processors is being used for specialized processes; or host devices are being underutilized.

After having detected the formation condition, the consolidation host device may form a pipeline that includes at least a first core and a second core, such as the pipeline 102 shown in FIG. 1. For instance, the consolidation host device may track a list of cores in different host devices and the attributes associated with such cores (e.g., whether a core is more tailored to execute certain types of instructions, whether a core is underutilized, and/or other factors). The consolidation host device may configure the pipeline to operate in a manner illustrated in FIG. 2 and described above.

In block 304, the consolidation host device may be configured to identify a first set of operations to be performed by a first virtual machine that are similar to a second set of operations to be performed by a second virtual machine. Similarly, in block 306, the consolidation host device may be configured to also identify a third set of operations to be performed by the same first virtual machine that are similar to a fourth set of operations to be performed by the same second virtual machine. In some embodiments, the two sets of operations to be performed by the first virtual machine may be different, and the two sets of operations to be performed by the second virtual machine may also be different.

In block 308, due to the similarity between the first set of operations and the third set of operations, the consolidation host device may be configured to consolidate these two sets of operations to be performed by the first core of the pipeline. Similarly, in block 310, due to the similarity of the second set of operations and the fourth set of operations, the consolidation host device may be configured to also consolidate these two sets of operations to be performed by the second core of the same pipeline.

Figure 4:
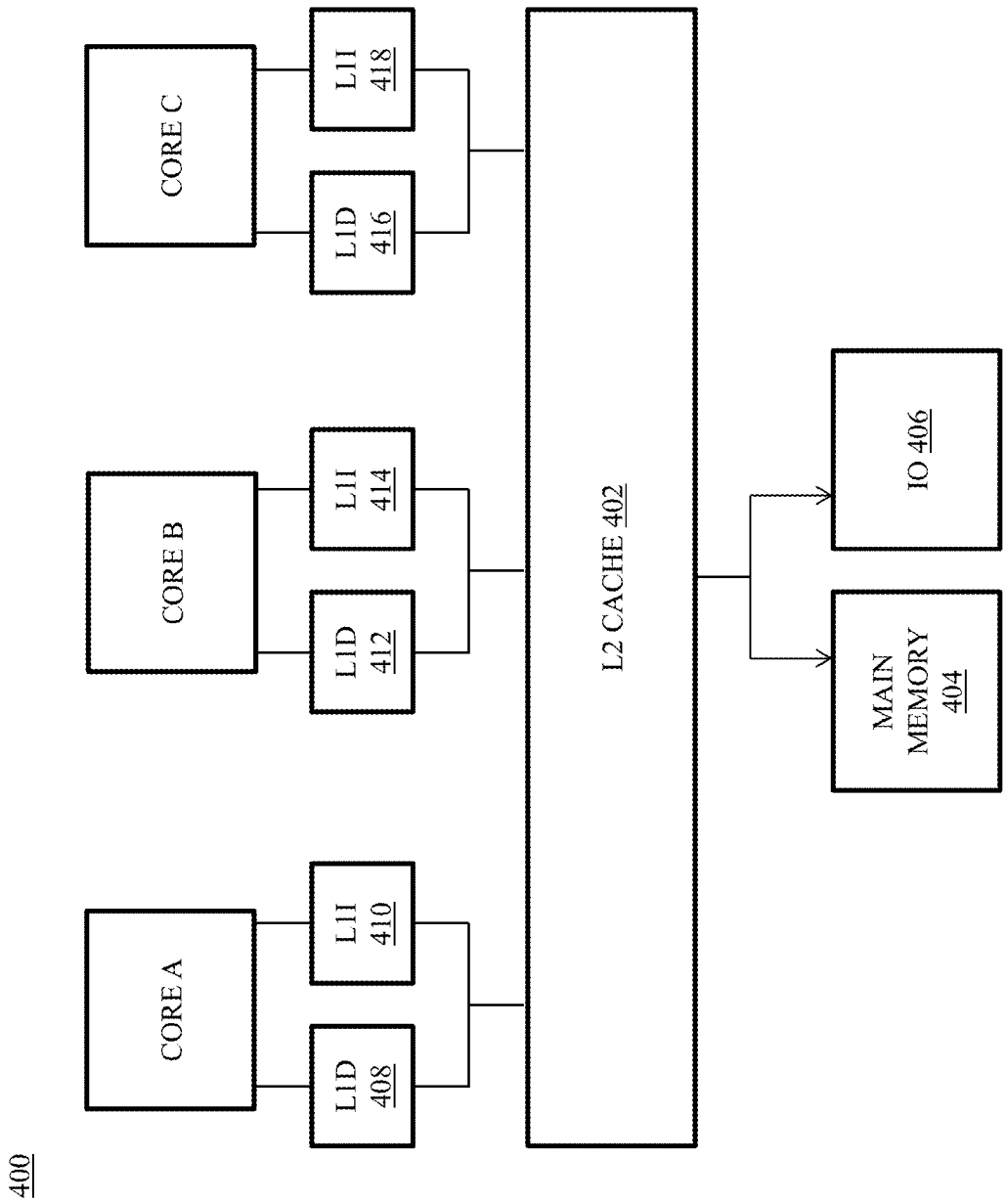
FIG. 4 is an example block diagram of a multi-core pipeline.

FIG. 4 is an example block diagram of a multi-core pipeline 400, which may correspond to the pipeline 102 of FIG. 1, in accordance with at least some embodiments of the present disclosure. The multi-cores, cores A, B, and C, may have private layer 1 data caches L1D 408, L1D 412, and L1D 416, respectively. Cores A, B, and C may also have private layer 1 instruction caches L1I 410, L1I 414, and L1I 418, respectively. Cores A, B, and C may share one public layer 2 cache, L2 cache 402. The L2 cache 402 may be further coupled to a main memory 404 and an input/output (10) 406. In some embodiments, the L2 cache 402, the private layer 1 data caches L1D 408, L1D 412, L1D 416, and private layer 1 instruction caches L1I 410, L1I 414, and L1I 418 may correspond to the table 104 of FIG. 1.

Suppose multiple virtual machines are configured to carry out a computation task that includes at least three operations, and the pipeline 400 is formed. Core A may be configured to perform the first operation of the computation task; core B may be configured to perform the second operation; and core C may be configured to perform the third operation. During the lifespan of the pipeline 400, the instruction cache L1I 410 of core A may contain the code segment corresponding to the first operation; the instruction cache L1I 414 of core B may contain the code segment corresponding to the second operation; and the instruction cache L1I 418 of core C may contain the code segment corresponding to the third operation. When a core finishes processing the code segment, an interrupt may be generated. In some embodiments, certain circuits in the host device configured to monitor and/or manage the pipeline 400 may be configured to check register statuses of the cores and assert interrupts when some conditions are met.

Figure 5:
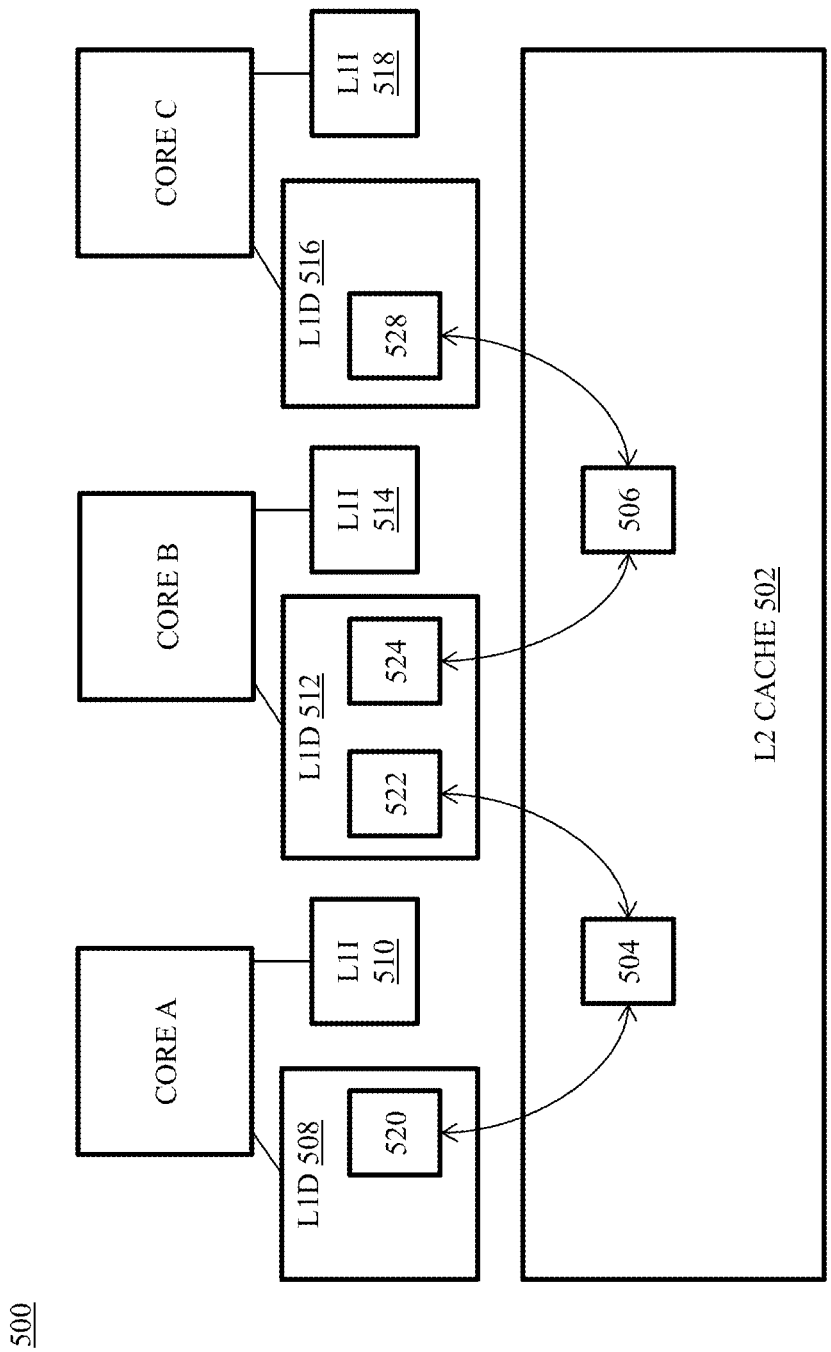
FIG. 5 illustrates an example of data passing in a multi-core pipeline.

The processed data may be passed along the pipeline 400. In other words, the data processed by core A may be passed to core B, and the data processed by core B may be passed to core C, and so on and so forth. FIG. 5 illustrates an example of data passing in a multi-core pipeline 500, which may correspond to the multi-core pipeline 400 of FIG. 4 or the pipeline 102 of FIG. 1, in accordance with at least some embodiments of the present disclosure. In particular, private layer 1 data caches L1D 508, L1D 512, and L1D 516 in the pipeline 500 may correspond to the data caches L1D 408, L1D 412, and L1D 416 of FIG. 4, respectively. Private layer 1 instruction caches L1I 510, L1I 514, and L1I 518 may correspond to the instruction caches L1I 410, L1I 414, and L1I 418 of FIG. 4, respectively. A public layer 2 cache, L2 cache 502, may correspond to the L2 cache 402 of FIG. 4 and the table 104 of FIG. 1. The private layer data caches and the public layer cache may include pages to facilitate the passing of data from one core to another in the pipeline 500. For example, the data cache L1D 508 may include a page 520; the data cache L1D 512 may include pages 522 and 524; the data cache L1D 516 may include a page 528; and the L2 cache 502 may include pages 504 and 506.

To illustrate an example of the data passing from the data cache L1D 508 of core A to the data cache L1D 516 of core C in the pipeline 500, suppose the page 520 in the data cache L1D 508 contains data to be passed to core B. Core A may write the data in the page 520 to the page 504 in the L2 cache 502. In some embodiments, the page 522 in the data cache L1D 512 of core B may be configured to correspond to a local copy of the page 504 in the L2 cache 502. As mentioned earlier, when core A completes processing of its assigned code segment, an interrupt may be generated, and a hypervisor may reset the program counter to the beginning of the code segment corresponding to the first operation of the computation task. For example, the hypervisor may be executed by the operating system of the host device configured to monitor and/or manage the operations of pipeline 500. The hypervisor may also mark page 522 as invalid and cause core B to reload page 522 with the data in the page 504. Similarly, after core B finishes processing the second operation, core B may pass data in the page 524 through the page 506 in the L2 cache 502. The hypervisor may reset the program counter to the beginning of the code segment corresponding to the second operation of the computation task. The hypervisor may mark the page 528 as invalid and cause the core C to reload the page 528 by reading in the data in the page 506.

Figure 6:
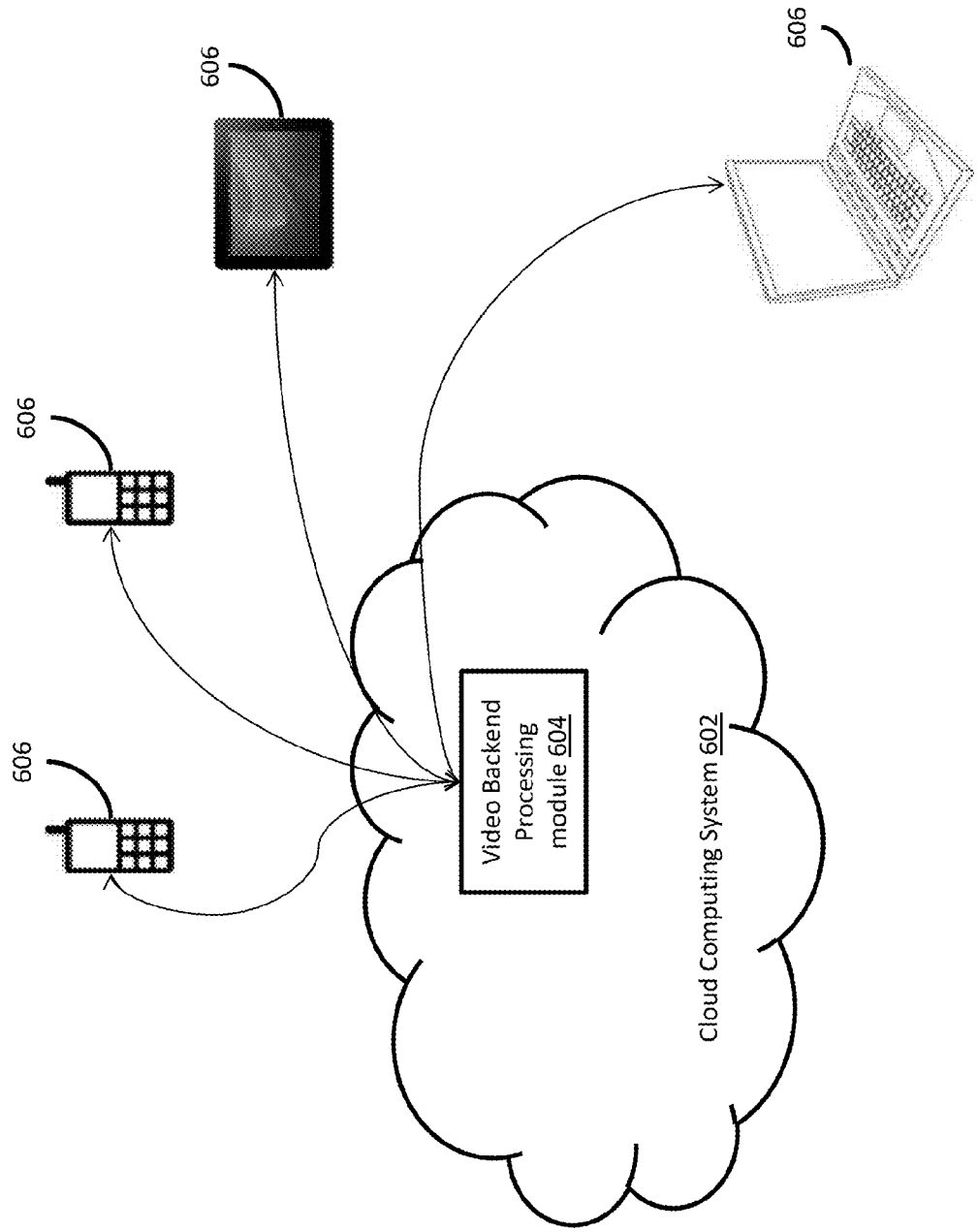
FIG. 6 illustrates an example cloud computing system configured to utilize a multi-core pipeline in connection with video processing.

FIG. 6 illustrates an example cloud computing system 602 configured to utilize the aforementioned multi-core pipeline in connection with video processing, in accordance with at least some embodiments of the present disclosure. The cloud computing system 602 may be used by many end users with their mobile devices 606, such as smart phones, tablets, laptop computers, etc. The cloud computing system 602 may include a video backend processing module 604, which may serve video applications executing on the mobile devices 606. For example, the mobile devices 606 may record video clips using the cameras on the mobile devices and transmit the video clips to the video backend processing module 604 in an uncompressed format for processing.

The video backend processing module 604 may be configured to perform three operations, for example. In the first operation, the video signal may be compressed, so that less storage space may be used to store the compressed data, and less bandwidth may be used to transmit the compressed data. In the second operation, the video signal may be edited and transcoded. When a video signal is transcoded, the video signal may be translated into another format, for example, with a different resolution, bit rate, color space, data compression standard, and/or other different characteristic. This second operation may be used, for example, because different applications may utilize different data recording formats and/or because channel conditions may dictate that some other resolution etc. should be used. For example, the end user may wish to keep a high-resolution copy of the recorded video clip for record keeping purposes. At the same time, a low-resolution copy that is at least reasonably error resilient may be used for sharing among friends on-line. In the third operation, the video backend processing module 604 may facilitate placing a URL on-line and sharing the URL on social networks, such as Facebook, Twitter, etc.

When the video applications utilizing the services provided by the video backend processing module 604 proliferate, multiple virtual machines running the video backend processing module 604 may be cloned to handle the additional requests from the video applications. After having detected the pipeline formation condition, a pipeline may be formed, so that the first and second operations may be carried out by certain cores that are tailored for multimedia processing tasks, for example, the Intel Sandy Bridge processors or TI multimedia video processor TMS320C80 and/or others. The third operation may be carried out by some general-purpose processors, such as, Intel Pentium and/or others.

Figure 7:
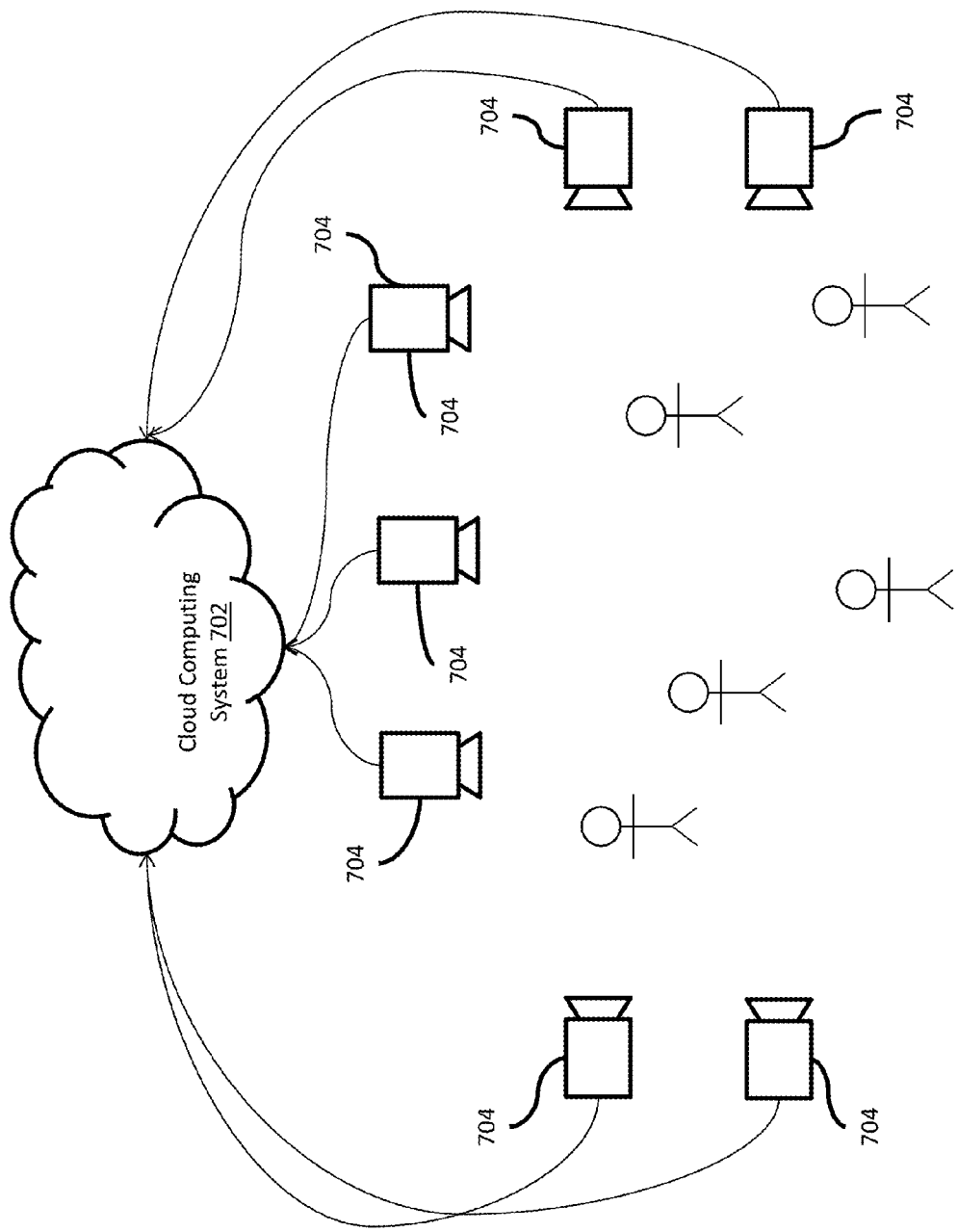
FIG. 7 illustrates an example cloud computing system configured to utilize a multi-core pipeline to support a surveillance camera network.

FIG. 7 illustrates an example cloud computing system 702 configured to utilize the aforementioned multi-core pipeline to support a surveillance camera network, in accordance with at least some embodiments of the present disclosure. The surveillance camera network may include many video cameras 704. These cameras may capture video signal streams and transmit them to the cloud computing system 702 for further processing.

The processing of these captured video signal streams may be partitioned into three operations. In the first operation, the video signal streams may be obtained. Some data security analysis may be carried out to check the integrity of the video streams. For instance, some video signals may be tampered with. In the second operation, the video signals may be processed to remove noises and then compressed. In the third operation, feature analysis, such as facial recognition, may be carried out to identify certain features or patterns in the video signal streams.

Because a large number of cameras may be used, a large number of virtual machines possibly may also be used to process the video data of the cameras. After having detected the pipeline formation condition, a pipeline having multiple types of cores may be formed. For example, the first operation may be carried out by a Crypto core in the IBM WireSpeed processor. The second operation may be carried out by a multimedia core, such as, without limitation, a MPEG4 encoder and decoder core in the Intel Sandy Bridge processor. The third operation may be carried out by a numerical computation core to handle floating point operations.

Figure 8:
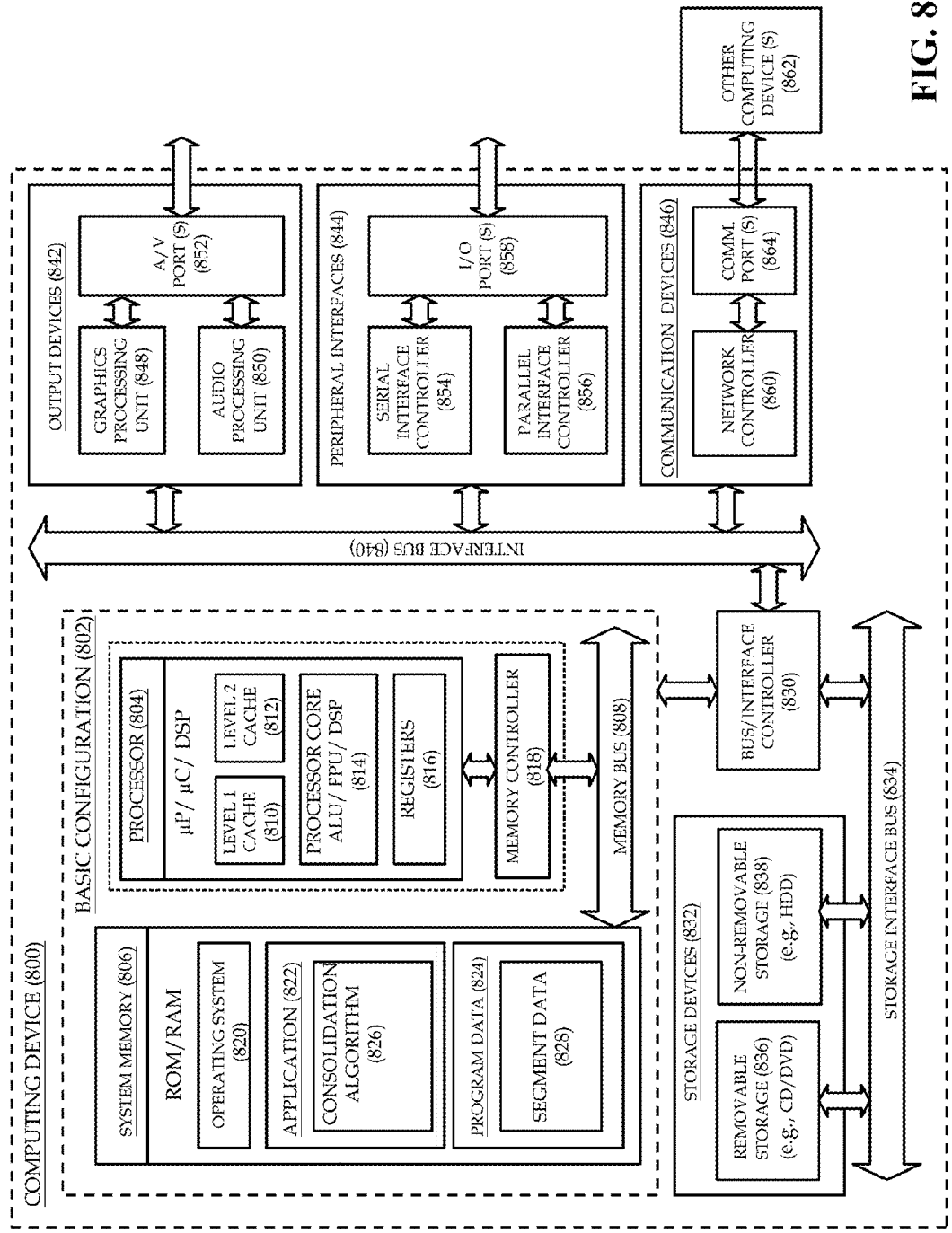
FIG. 8 is a block diagram of an example computing device that may be arranged to consolidate operations of a plurality of host devices.

FIG. 8 is a block diagram illustrating an example computing device 800 that may be arranged to consolidate operations of a plurality of host devices in accordance with the present disclosure. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824. Application 822 may include a monitoring module, which may further include a consolidation algorithm 826 that is arranged to perform at least operations 302, 304, 306, 308, and/or 310 of FIG. 3. Program data 824 may include segment data 828, which may be separated from the other segments of one virtual machine and/or consolidated with similar segments from other virtual machines for pipelining, as is described herein. In some embodiments, application 822 may be arranged to operate with program data 824 on operating system 820, such that operations of a plurality of host devices can be consolidated, as described herein. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact-disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

FIG. 9 shows a block diagram illustrating a computer program product 900 that is arranged to consolidate computation tasks associated with a plurality of virtual machines, in accordance with at least some embodiments of the present disclosure. Computer program product 900 may include signal bearing medium 904, which may include one or more sets of executable instructions 902 that, when executed by, for example, a processor of a computing device, may provide at least the functionality described above and illustrated in FIG. 3.

In some implementations, signal bearing medium 904 may encompass non-transitory computer readable medium 908, such as, but not limited to, a hard disk drive (HDD), a Compact Disc (CD), a Digital Versatile Disk (DVD), a digital tape, memory, etc. In some implementations, signal bearing medium 904 may encompass recordable medium 910, such as, but not limited to, memory, read/write (R/W) CDs, R/W DVDs, etc. In some implementations, signal bearing medium 904 may encompass communications medium 906, such as, but not limited to, a digital and/or an analog communication medium (e.g., a fiber optic cable, a waveguide, a wired communication link, a wireless communication link, etc.) Computer program product 900 may also be recorded in non-transitory computer readable medium 908 or another similar recordable medium 910.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation;

or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to consolidate computation tasks associated with a plurality of virtual machines that run on two or more host devices, the method comprising:
    operating a first host device and a second host device, wherein the first host device is operated at a first data center that is located at a first physical location, and wherein the second host device is operated at a second data center that is located at a second physical location;
    detecting a pipeline formation condition based on at least one of:
        determining that at least one of the first host device and the second host device is underutilized,
        determining that a number of instances of application of a virtual machine fork operation exceeds a threshold number, and
        determining that a specific number of general purpose processors or general purpose cores are used to perform specialized operations;
        forming a pipeline that includes at least a first core and a second core,
    after having detected the pipeline formation condition;
    identifying a first set of operations of a first virtual machine on the first host device that are similar to a second set of operations of a second virtual machine on the second host device, wherein identifying the first set of operations that are similar to the second set of operations comprises identifying that each of the first set of operations and the second set of operations are associated with a first type of computation;
    identifying a third set of operations of the first virtual machine that are similar to a fourth set of operations of the second virtual machine, wherein identifying the third set of operations that are similar to the fourth set of operations comprises identifying that each of the third set of operations and the fourth set of operations are associated with a second type of computation;
    dispatching the first set of operations and the second set of operations to the first core of the pipeline for execution; and
    dispatching the third set of operations and the fourth set of operations to the second core of the pipeline for execution, wherein the first core is more tailored to perform the first type of computation relative to the second core, and wherein the second core is more tailored to perform the second type of computation relative to the first core.

2. The method of claim 1, further comprising partitioning the computation tasks into a plurality of sets of operations.

3. The method of claim 1, further comprising cloning the first virtual machine to obtain the second virtual machine.

4. The method of claim 1, wherein identifying the first set of operations that are similar to the second set of operations comprises determining that each of the first set of operations and the second set of operations are based on a same type of instructions.

5. The method of claim 1, further comprising passing data from the first core of the pipeline to the second core of the pipeline through at least one of a private layer data cache and a public layer cache.

6. A non-transitory computer readable medium that includes executable instructions, which in response to execution by a processor, cause the processor to perform or control performance of a method to consolidate computation tasks associated with a plurality of virtual machines that run on two or more host devices, wherein the method comprises:
    instructing operation of a first host device and a second host device, wherein the first host device is operated at a first data center that is located at a first physical location, and wherein the second host device is operated at a second data center that is located at a second physical location;
    cloning a first virtual machine to obtain a second virtual machine;
    identifying a first set of operations of the first virtual machine on the first host device that are similar to a second set of operations of the second virtual machine on the second host device, wherein identifying the first set of operations that are similar to the second set of operations comprises identifying that each of the first set of operations and the second set of operations are associated with a first type of computation;
    identifying a third set of operations of the first virtual machine that are similar to a fourth set of operations of the second virtual machine, wherein identifying the third set of operations that are similar to the fourth set of operations comprises identifying that each of the third set of operations and the fourth set of operations are associated with a second type of computation;
    dispatching the first set of operations and the second set of operations to a first core of a pipeline for execution; and
    dispatching the third set of operations and the fourth set of operations to a second core of the pipeline for execution.

7. The non-transitory computer readable medium of claim 6, wherein the method further comprises:
    partitioning the computation tasks into a plurality of sets of operations.

8. The non-transitory computer readable medium of claim 6, wherein the first core is more tailored to perform the first type of computation relative to the second core, and wherein the second core is more tailored to perform the second type of computation relative to the first core.

9. The non-transitory computer readable medium of claim 6, wherein the method further comprises;
    determining whether at least one of the first host device and the second host device is underutilized.

10. The non-transitory computer readable medium of claim 6, wherein the method further comprises:

determining whether a number of instances of applying a virtual machine fork operation exceeds a threshold number.

11. The non-transitory computer readable medium of claim 6, wherein identifying the first set of operations that are similar to the second set of operations comprises determining that each of the first set of operations and the second set of operations are based on a same type of instructions.

12. The non-transitory computer readable medium of claim 6, wherein the method further comprises:
passing data from the first core of the pipeline to the second core of the pipeline through at least one of a private layer data cache and a public layer cache.

13. An apparatus, comprising:
a multi-core processor that includes a first core and a second core formed in a pipeline, wherein formation of the first core and the second core in the pipeline is based on detection of a pipeline formation condition according to at least one of:
determination that at least one of a first host device and a second host device is underutilized,
determination that a number of instances of application of a virtual machine fork operation exceeds a threshold number, and
determination that a particular number of general purpose processors or general purpose cores are used to perform specialized operations;
a monitor module operatively coupled to the multi-core processor, and configured to:
identify a first set of operations of a first virtual machine that runs on the first host device that are similar to a second set of operations of a second virtual machine that runs on the second host device, wherein the identification of the first set of operations includes an identification that each of the first set of operations and the second set of operations are associated with a first type of computation, and
identify a third set of operations of the first virtual machine that are similar to a fourth set of operations of the second virtual machine, wherein the identification of the third set of operations includes an identification that each of the third set of operations and the fourth set of operations are associated with a second type of computation; and
a hypervisor operatively coupled to the multi-core processor and configured to, in response to the identification of the first set of operations and the identification of the third set of operations:
dispatch the first set of operations and the second set of operations to the first core of the pipeline for execution;
dispatch the third set of operations and the fourth set of operations to the second core of the pipeline for execution; and
pass data from the first core of the pipeline to the second core of the pipeline through at least one of a private layer data cache and a public layer cache.

14. The apparatus of claim 13, wherein the monitor module comprises executable instructions of an application configured to interact with an operating system operatively coupled to the multi-core processor.

* * * * *

UNITED STATES PATENT AND TRADEMARK OFFICE
CERTIFICATE OF CORRECTION

PATENT NO.        : 9,852,000 B2
APPLICATION NO.   : 14/915217
DATED             : December 26, 2017
INVENTOR(S)       : Ma It is certified that error appears in the above-identified patent and that said Letters Patent is hereby corrected as shown below:

In the Specification

In Column 6, Lines 32-33, delete "input/output (10)" and insert -- input/output (IO) --, therefor.

In the Claims

In Column 13, Line 45, in Claim 1, delete "after having…condition;" and insert the same at Line 44, therefor, as a continuation sub-point.

In Column 15, Line 30, in Claim 13, delete "configured to:" and insert the same at Line 29, therefor, as a continuation sub-point.

Signed and Sealed this
First Day of May, 2018

Andrei Iancu
*Director of the United States Patent and Trademark Office*